(12) United States Patent
Davis et al.

(10) Patent No.: US 11,126,516 B2
(45) Date of Patent: *Sep. 21, 2021

(54) DYNAMIC FORMATION OF A FAILURE DOMAIN

(71) Applicant: Pure Storage, Inc., Mountain View, CA (US)

(72) Inventors: John Davis, San Francisco, CA (US); Robert Lee, San Carlos, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/888,156

(22) Filed: May 29, 2020

(65) Prior Publication Data

US 2020/0293414 A1 Sep. 17, 2020

Related U.S. Application Data

(63) Continuation of application No. 15/172,197, filed on Jun. 3, 2016, now Pat. No. 10,691,567.

(51) Int. Cl.
*G06F 11/00* (2006.01)
*G06F 11/20* (2006.01)
*G06F 11/07* (2006.01)

(52) U.S. Cl.
CPC .......... *G06F 11/2094* (2013.01); *G06F 11/07* (2013.01); *G06F 11/20* (2013.01); *G06F 2201/805* (2013.01)

(58) Field of Classification Search
CPC .............. G06F 11/142; G06F 11/1666; G06F 11/2094; G06F 2212/466; G06F 2212/7206

See application file for complete search history.

(56) References Cited

U.S. PATENT DOCUMENTS

| | | |
|---|---|---|
| 5,706,210 A | 1/1998 | Kumano et al. |
| 5,799,200 A | 8/1998 | Brant et al. |
| 5,933,598 A | 8/1999 | Scales et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,676,694 B2 * | 3/2010 | Sullivan ................ G06F 11/006 714/25 |
| 7,689,609 B2 | 3/2010 | Lango et al. |
| 7,743,191 B1 | 6/2010 | Liao |

(Continued)

*Primary Examiner* — Elmira Mehrmanesh
(74) *Attorney, Agent, or Firm* — Womble Bond Dickinson (US) LLP

(57) ABSTRACT

Dynamically forming a failure domain in a storage system that includes a plurality of blades, each blade mounted within one of a plurality of chassis, including: identifying, in dependence upon a failure domain formation policy, an available configuration for a failure domain that includes a first blade mounted within a first chassis and a second blade mounted within a second chassis, wherein each chassis is configured to support multiple types of blades; and creating the failure domain in accordance with the available configuration.

17 Claims, 9 Drawing Sheets

(56) References Cited

U.S. PATENT DOCUMENTS

| | | | |
|---|---|---|---|
| 7,840,656 B2 * | 11/2010 | Holdaway | G06F 9/5061 709/221 |
| 8,042,163 B1 | 10/2011 | Karr et al. | |
| 8,086,585 B1 | 12/2011 | Brashers et al. | |
| 8,161,315 B2 * | 4/2012 | Holdaway | G06F 11/2038 714/4.11 |
| 8,387,136 B2 | 2/2013 | Lee et al. | |
| 8,465,332 B2 | 6/2013 | Hogan et al. | |
| 8,578,442 B1 | 11/2013 | Banerjee | |
| 8,613,066 B1 | 12/2013 | Brezinski et al. | |
| 8,620,970 B2 | 12/2013 | English et al. | |
| 8,762,642 B2 | 6/2014 | Bates et al. | |
| 8,769,622 B2 | 7/2014 | Chang et al. | |
| 8,800,009 B1 | 8/2014 | Beda, III et al. | |
| 8,812,860 B1 | 8/2014 | Bray | |
| 8,850,546 B1 | 9/2014 | Field et al. | |
| 8,874,836 B1 * | 10/2014 | Hayes | G06F 3/0679 711/103 |
| 8,898,346 B1 | 11/2014 | Simmons | |
| 8,909,854 B2 | 12/2014 | Yamagishi et al. | |
| 8,931,041 B1 | 1/2015 | Banerjee | |
| 8,949,863 B1 | 2/2015 | Coatney et al. | |
| 8,984,602 B1 | 3/2015 | Bailey et al. | |
| 8,990,905 B1 | 3/2015 | Bailey et al. | |
| 9,003,144 B1 * | 4/2015 | Hayes | G06F 3/0683 711/162 |
| 9,021,297 B1 * | 4/2015 | Hayes | G06F 12/0246 714/6.3 |
| 9,082,512 B1 * | 7/2015 | Davis | G06F 11/1048 |
| 9,124,569 B2 | 9/2015 | Hussain et al. | |
| 9,134,922 B2 | 9/2015 | Rajagopal et al. | |
| 9,209,973 B2 | 12/2015 | Aikas et al. | |
| 9,300,660 B1 | 3/2016 | Borowiec et al. | |
| 9,684,531 B2 * | 6/2017 | Jacobs | H04L 47/70 |
| 10,691,567 B2 * | 6/2020 | Davis | G06F 11/07 |
| 2003/0225961 A1 | 12/2003 | Chow et al. | |
| 2004/0080985 A1 | 4/2004 | Chang et al. | |
| 2004/0153844 A1 | 8/2004 | Ghose et al. | |
| 2004/0193814 A1 | 9/2004 | Erickson et al. | |
| 2004/0260967 A1 | 12/2004 | Guha et al. | |
| 2005/0216800 A1 | 9/2005 | Bicknell et al. | |
| 2006/0015771 A1 | 1/2006 | Vana Gundy et al. | |
| 2006/0129817 A1 | 6/2006 | Borneman et al. | |
| 2006/0161726 A1 | 7/2006 | Lasser | |
| 2006/0230245 A1 | 10/2006 | Gounares et al. | |
| 2006/0239075 A1 | 10/2006 | Wiliams et al. | |
| 2007/0022227 A1 | 1/2007 | Miki | |
| 2007/0028068 A1 | 2/2007 | Golding et al. | |
| 2007/0109856 A1 | 5/2007 | Pellicone et al. | |
| 2007/0150689 A1 | 6/2007 | Pandit et al. | |
| 2007/0220227 A1 | 9/2007 | Long | |
| 2007/0294564 A1 | 12/2007 | Reddin et al. | |
| 2008/0005587 A1 | 1/2008 | Ahlquist | |
| 2008/0077825 A1 | 3/2008 | Bello et al. | |
| 2008/0282045 A1 | 11/2008 | Biswas et al. | |
| 2009/0100115 A1 | 4/2009 | Park et al. | |
| 2010/0052625 A1 | 3/2010 | Cagno et al. | |
| 2010/0211723 A1 | 8/2010 | Mukaida | |
| 2010/0246266 A1 | 9/2010 | Park et al. | |
| 2010/0257142 A1 | 10/2010 | Murphy et al. | |
| 2010/0262764 A1 | 10/2010 | Liu et al. | |
| 2010/0325345 A1 | 12/2010 | Ohno et al. | |
| 2010/0332754 A1 | 12/2010 | Lai et al. | |
| 2011/0072290 A1 | 3/2011 | Davis et al. | |
| 2011/0125955 A1 | 5/2011 | Chen | |
| 2011/0131231 A1 | 6/2011 | Haas et al. | |
| 2011/0167221 A1 | 7/2011 | Pangal et al. | |
| 2012/0054264 A1 | 3/2012 | Haugh et al. | |
| 2012/0079318 A1 | 3/2012 | Colgrove et al. | |
| 2012/0131253 A1 | 5/2012 | McKnight et al. | |
| 2012/0303919 A1 | 11/2012 | Hu et al. | |
| 2013/0007845 A1 | 1/2013 | Chang et al. | |
| 2013/0031414 A1 | 1/2013 | Dhuse et al. | |
| 2013/0036272 A1 | 2/2013 | Nelson | |
| 2013/0071087 A1 | 3/2013 | Motiwala et al. | |
| 2013/0145447 A1 | 6/2013 | Maron | |
| 2013/0205173 A1 | 8/2013 | Yoneda | |
| 2013/0219164 A1 | 8/2013 | Hamid | |
| 2013/0227201 A1 | 8/2013 | Talagala et al. | |
| 2013/0290607 A1 | 10/2013 | Chang et al. | |
| 2013/0311434 A1 | 11/2013 | Jones | |
| 2013/0332614 A1 | 12/2013 | Brunk et al. | |
| 2014/0020083 A1 | 1/2014 | Fetik | |
| 2014/0074850 A1 | 3/2014 | Noel et al. | |
| 2014/0082715 A1 | 3/2014 | Grajek et al. | |
| 2014/0086146 A1 | 3/2014 | Kim et al. | |
| 2014/0090009 A1 | 3/2014 | Li et al. | |
| 2014/0096220 A1 | 4/2014 | Da Cruz Pinto et al. | |
| 2014/0101434 A1 | 4/2014 | Senthurpandi et al. | |
| 2014/0164774 A1 | 6/2014 | Nord et al. | |
| 2014/0173232 A1 | 6/2014 | Reohr et al. | |
| 2014/0195636 A1 | 7/2014 | Karve et al. | |
| 2014/0201512 A1 | 7/2014 | Seethaler et al. | |
| 2014/0201541 A1 | 7/2014 | Paul et al. | |
| 2014/0208155 A1 | 7/2014 | Pan | |
| 2014/0215590 A1 | 7/2014 | Brand | |
| 2014/0229654 A1 | 8/2014 | Goss et al. | |
| 2014/0230017 A1 | 8/2014 | Saib | |
| 2014/0258526 A1 | 9/2014 | Le Sant et al. | |
| 2014/0282983 A1 | 9/2014 | Ju et al. | |
| 2014/0285917 A1 | 9/2014 | Cudak et al. | |
| 2014/0325262 A1 | 10/2014 | Cooper et al. | |
| 2014/0351627 A1 | 11/2014 | Best et al. | |
| 2014/0373104 A1 | 12/2014 | Gaddam et al. | |
| 2014/0373126 A1 | 12/2014 | Hussain et al. | |
| 2015/0026387 A1 | 1/2015 | Sheredy et al. | |
| 2015/0074463 A1 | 3/2015 | Jacoby et al. | |
| 2015/0089569 A1 | 3/2015 | Sondhi et al. | |
| 2015/0095515 A1 | 4/2015 | Krithivas et al. | |
| 2015/0113203 A1 | 4/2015 | Dancho et al. | |
| 2015/0121137 A1 | 4/2015 | McKnight et al. | |
| 2015/0149822 A1 | 5/2015 | Coronado et al. | |
| 2015/0356005 A1 * | 12/2015 | Hayes | G06F 3/06 711/102 |
| 2015/0378888 A1 | 12/2015 | Zhang et al. | |
| 2016/0098323 A1 | 4/2016 | Mutha et al. | |

\* cited by examiner

DYNAMIC FORMATION OF A FAILURE DOMAIN

DESCRIPTION OF EMBODIMENTS

Figure 1:
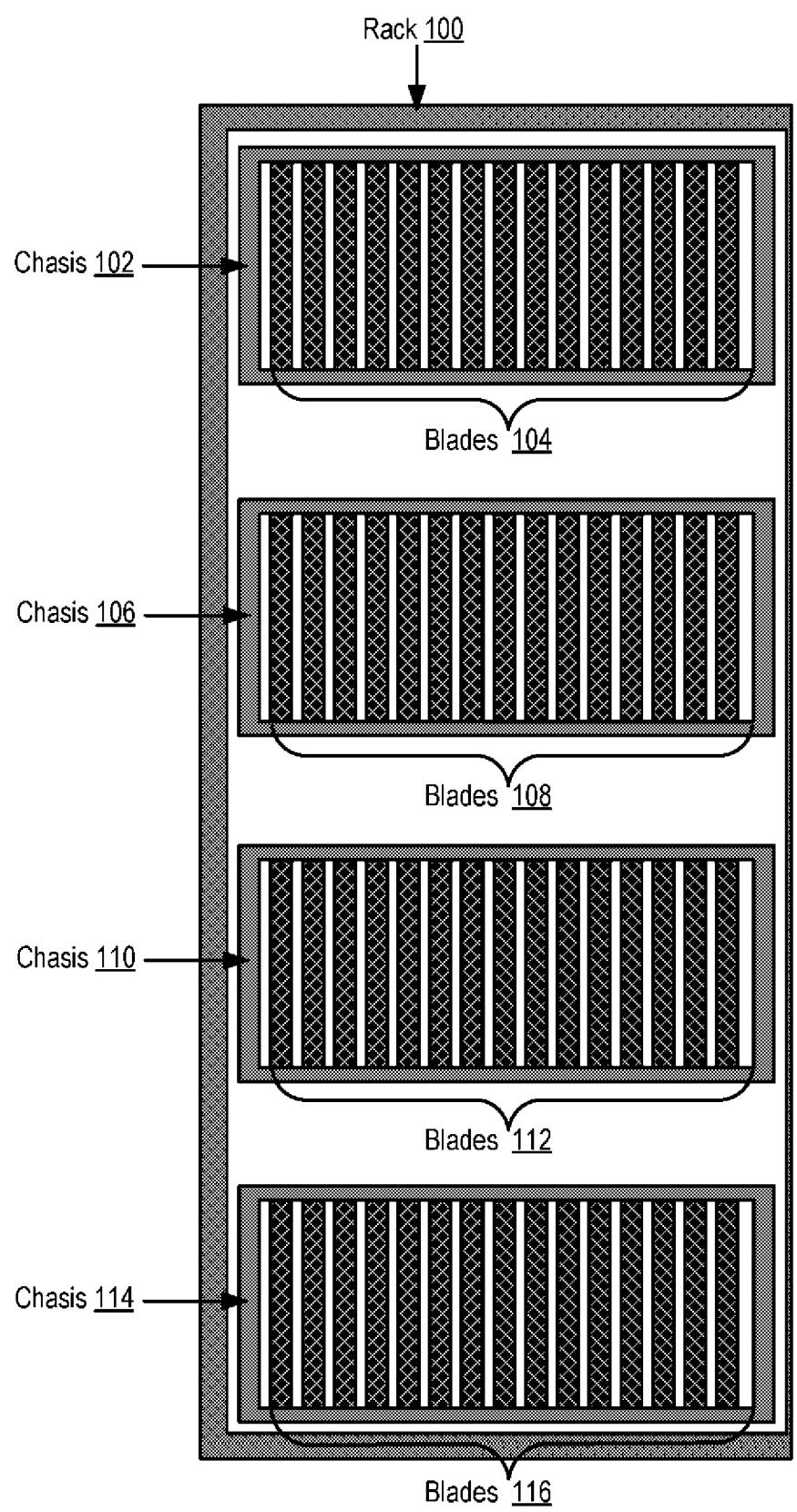
FIG. 1 sets forth a diagram of a storage system in which a failure domain may be dynamically formed according to embodiments of the present disclosure.

The present disclosure relates to dynamically forming a failure domain in a storage system that includes a plurality of blades. Each of the blades in the storage system may be embodied, for example, as a computing device that includes one or more computer processors, dynamic random access memory (DRAM'), flash memory, interfaces for one more communication busses, interfaces for one or more power distribution busses, cooling components, and so on. Although the blades will be described in more detail below, readers will appreciate that the blades may be embodied as different types of blades, such that the collective set of blades include heterogeneous members. Blades may be of different types as some blades may only provide processing resources to the overall storage system, some blades may only provide storage resources to the overall storage system, and some blades may provide both processing resources and storage resources to the overall storage system.

Each of the blades in the storage system may be mounted within one of a plurality of chassis. Each chassis may be embodied, for example, as physical structure that helps protect and organize components within the storage system. Each chassis may include a plurality of slots, where each slot is configured to receive a blade. Each chassis may also include one or more mechanisms such as a power distribution bus that is utilized to provide power to each blade that is mounted within the chassis, one or more data communication mechanisms such as a data communication bus that enables communication between each blade that is mounted within the chassis, one or more data communication mechanisms such as a data communication bus that enables communication between each blade that is mounted within and an external data communications network, and so on. In fact, each chassis may include at least two instances of both the power distribution mechanism and the communication mechanisms, where each instance of the power distribution mechanism and each instance of the communication mechanisms may be enabled or disabled independently.

As mentioned above, the present disclosure relates to dynamically forming a failure domain in a storage system that includes a plurality of blades. A failure domain may represent a group of components within the storage system that can be negatively impacted by the failure of another component in the storage system. Such a failure domain may be embodied, for example, as a group of blades that are physically dependent on a particular component (e.g., a group of blades connected to the same power source) or as a group of blades that are logically dependent on a particular component. For example, a failure domain may consist of a group of blades that some piece of data (e.g., all data in a database) is striped across. In such an example, a failure of one of the blades could negatively impact the group of blades that are logically dependent upon each other, as the portion of the piece of data that is stored on the failed blade could be lost.

In example embodiments described in more detail below, dynamically forming a failure domain in a storage system may be carried out by identifying, in dependence upon a failure domain formation policy, an available configuration for a failure domain. The failure domain formation policy may be embodied, for example, as a set of rules that are used to identify satisfactory configurations for a particular failure domain. The failure domain formation policy may include rules, for example, that specify:

- the maximum number of blades in each chassis that may be included in the failure domain
- the maximum number of blades in a particular failure domain that may fail without data loss
- the maximum number of chassis in a particular failure domain that may fail without data loss
- the maximum number of network hops that are permissible between two or more blades in a particular failure domain
- the minimum amount of network bandwidth that must be available between two or more blades in a particular failure domain
- the minimum amount of storage capacity for one or more blades in a particular failure domain
- the maximum age for one or more blades in a particular storage domain Readers will appreciate that many other rules that take into account may other considerations may be included in a failure domain formation policy according to embodiments of the present disclosure. In such an example, configurations that do not adhere to the rules set forth in the failure domain formation policy may not be used to form a failure domain. Identifying an available configuration for a failure domain in dependence upon a failure domain formation policy may be carried out, for example, by identifying all possible configurations and identifying the configurations that satisfy the rules set forth in the failure domain formation policy.

Readers will further appreciate that one or more characteristics of the storage system may change over time, such that a particular set of blades may adhere to a failure domain formation policy at one point in time, but the same set of blades may not adhere to a failure domain formation policy at another point in time some. Consider an example in which a failure domain formation policy includes one or more rules that specify the minimum amount of storage capacity required for one or more blades in a particular failure domain. In such an example, a particular blade may initially include an amount of capacity that exceeds the minimum amount of storage capacity required for the blades in the particular failure domain. As the blade ages and computer storage within the blade begins to fail (e.g., a particular device fails, the number of bad blocks in a storage device grows), however, the particular blade may no longer include an amount of capacity that exceeds the minimum amount of storage capacity required for the blades in the particular failure domain. As such, any failure domain that includes the particular blade would no longer adhere to the failure domain formation policy. The failure domain formation policy may therefore be applied on a continuous basis, according to a predetermined schedule, at the behest of a user such as a system administrator, or in some other manner so as to verify that a particular failure domain continues to adhere to the failure domain formation policy.

Consider an example in which the failure domain formation policy contains rules indicating that the failure domain should include three blades that data will be striped across, and that the failure domain should utilize an n+1 data redundancy policy such that two of the blades will contain user data and the other blade will contain redundancy data (e.g., parity data that may be used to reconstruct user data in the event of a blade failure). Assume that the failure domain formation policy also includes one or more rules specifying that, for a given stripe, the loss of one blade should not result in user data being lost while the loss of two or more blades can result in user data being lost. Continuing with the example, assume that the failure domain formation policy also contains one or more rules specifying that the failure domain should be able to tolerate the failure an entire chassis without the loss of user data while the loss of two or more chassis can result in user data being lost. Readers will appreciate that while many possible configurations that include three blades can be identified, some of those configurations would not adhere to the failure domain formation policy. For example, a configuration in which all three blades are located on a single chassis would not adhere to the failure domain formation policy as the failure of the single chassis would result in the loss of user data, given that all three blades in the failure domain would be lost. A configuration that includes one and only one blade from each of the three chassis, however, would adhere to the failure domain formation policy as the failure of any single chassis would not result in the loss of user data, given that only one of the three blades in the failure domain would be lost if a single chassis were to fail.

In example embodiments described in more detail below, dynamically forming a failure domain in a storage system may be carried out by creating the failure domain in accordance with the available configuration for a failure domain. Creating the failure domain in accordance with the available configuration may be carried out, for example, by configuring a storage array controller or other component that writes data to the storage system to write data for applications, users, or other entities that are associated with a particular failure domain to the blades that are included in the available configuration that was identified for the failure domain. Readers will appreciate that in such an example, the failure domain can include at least a one blade mounted within a first chassis and another blade mounted within a second chassis.

Example methods, apparatus, and products for dynamically forming a failure domain in a storage system that includes a plurality of blades in accordance with the present invention are described with reference to the accompanying drawings, beginning with FIG. 1. FIG. 1 sets forth a diagram of a storage system in which a failure domain may be dynamically formed according to embodiments of the present disclosure. The storage system of FIG. 1 includes a plurality of chassis (102, 106, 110, 114) mounted within a rack (100). The rack (100) depicted in FIG. 1 may be embodied as a standardized frame or enclosure for mounting multiple equipment modules, such as each of the chassis (102, 106, 110, 114) depicted in FIG. 1. The rack (100) may be embodied, for example, as a 19-inch rack that includes edges or ears that protrude on each side, thereby enabling a chassis (102, 106, 110, 114) or other module to be fastened to the rack (100) with screws or some other form of fastener. Readers will appreciate that while the storage system depicted in FIG. 1 includes a plurality of chassis (102, 106, 110, 114) mounted within a single rack (100), in other embodiments the plurality of chassis (102, 106, 110, 114) may be distributed across multiple racks. For example, a first chassis in the storage system may be mounted within a first rack, a second chassis in the storage system may be mounted within a second rack, and so on.

The chassis (102, 106, 110, 114) depicted in FIG. 1 may be embodied, for example, as passive elements that includes no logic. Each chassis (102, 106, 110, 114) may include a plurality of slots, where each slot is configured to receive a blade. Each chassis (102, 106, 110, 114) may also include a mechanism, such as a power distribution bus, that is utilized to provide power to each blade that is mounted within the chassis (102, 106, 110, 114). Each chassis (102, 106, 110, 114) may further include a communication mechanism, such as a communication bus, that enables communication between each blade that is mounted within the chassis (102, 106, 110, 114). The communication mechanism may be embodied, for example, as an Ethernet bus, Peripheral Component Interconnect Express ('PCIe') bus, InfiniBand bus, and so on. In some embodiments, each chassis (102, 106, 110, 114) may include at least two instances of both the power distribution mechanism and the communication mechanism, where each instance of the power distribution mechanism and each instance of the communication mechanism may be enabled or disabled independently.

Each chassis (102, 106, 110, 114) depicted in FIG. 1 may also include one or more ports for receiving an external communication bus that enables communication between multiple chassis (102, 106, 110, 114), directly or through a switch, as well as communications between a chassis (102, 106, 110, 114) and an external client system. The external communication bus may use a technology such as Ethernet, InfiniBand, Fibre Channel, and so on. In some embodiments, the external communication bus may use different communication bus technologies for inter-chassis communication than is used for communication with an external client system. In embodiments where one or more switches are deployed, each switch may act as a translation between multiple protocols or technologies. When multiple chassis (102, 106, 110, 114) are connected to define a storage cluster, the storage cluster may be accessed by a client using either proprietary interfaces or standard interfaces such as network file system ('NFS'), common internet file system ('CIFS'), small computer system interface ('SCSI'), hypertext transfer protocol (1-ITTP'), and so on. Translation from the client protocol may occur at the switch, external communication bus, or within each blade.

Each chassis (102, 106, 110, 114) depicted in FIG. 1 houses fifteen blades (104, 108, 112, 116), although in other embodiments each chassis (102, 106, 110, 114) may house more or fewer blades. Each of the blades (104, 108, 112, 116) depicted in FIG. 1 may be embodied, for example, as a computing device that includes one or more computer processors, dynamic random access memory ('DRAM'), flash memory, interfaces for one more communication busses, interfaces for one or more power distribution busses, cooling components, and so on. Although the blades (104, 108, 112, 116) will be described in more detail below, readers will appreciate that the blades (104, 108, 112, 116) depicted in FIG. 1 may be embodied as different types of blades, such that the collective set of blades (104, 108, 112, 116) include heterogeneous members. Blades may be of different types as some blades (104, 108, 112, 116) may only provide processing resources to the overall storage system, some blades (104, 108, 112, 116) may only provide storage resources to the overall storage system, and some blades (104, 108, 112, 116) may provide both processing resources and storage resources to the overall storage system. Furthermore, even the blades (104, 108, 112, 116) that are identical in type may be different in terms of the amount of storage resources that the blades (104, 108, 112, 116) provide to the overall storage system. For example, a first blade that only provides storage resources to the overall storage system may provide 8 TB of storage while a second blade that only provides storage resources to the overall storage system may provide 256 TB of storage. The blades (104, 108, 112, 116) that are identical in type may also be different in terms of the amount of processing resources that the blades (104, 108, 112, 116) provide to the overall storage system. For example, a first blade that only provides processing resources to the overall storage system may include more processors or more powerful processors than a second blade that only provides processing resources to the overall storage system. Readers will appreciate that other differences may also exist between two individual blades and that blade uniformity is not required according to embodiments described herein.

Although not explicitly depicted in FIG. 1, each chassis (102, 106, 110, 114) may include one or more modules, data communications bus, or other apparatus that is used to identify which type of blade is inserted into a particular slot of the chassis (102, 106, 110, 114). In such an example, a management module may be configured to request information from each blade in each chassis (102, 106, 110, 114) when each blade is powered on, when the blade is inserted into a chassis (102, 106, 110, 114), or at some other time. The information received by the management module can include, for example, a special purpose identifier maintained by the blade that identifies the type (e.g., storage blade, compute blade, hybrid blade) of blade that has been inserted into the chassis (102, 106, 110, 114). In an alternative embodiment, each blade (102, 106, 110, 114) may be configured to automatically provide such information to a management module as part of a registration process.

In the example depicted in FIG. 1, the storage system may be initially configured by a management module that is executing remotely. The management module may be executing, for example, in a network switch control processor. Readers will appreciate that such a management module may be executing on any remote CPU and may be coupled to the storage system via one or more data communication networks. Alternatively, the management module may be executing locally as the management module may be executing on one or more of the blades (104, 108, 112, 116) in the storage system.

In the example depicted in FIG. 1, one or more of the blades (104, 108, 112, 116) may be used for dynamically configuring the storage system to facilitate independent scaling of resources by: identifying, in dependence upon a failure domain formation policy, an available configuration for a failure domain that includes a first blade mounted within a first chassis and a second blade mounted within a second chassis, wherein each chassis is configured to support multiple types of blades; creating the failure domain in accordance with the available configuration; determining whether a topology of the storage system has changed, wherein identifying the available configuration for the failure domain is carried out responsive to affirmatively determining that the topology of the storage system has changed; determining whether the failure domain formation policy has changed, wherein identifying the available configuration for the failure domain is carried out responsive to affirmatively determining that the failure domain formation policy has changed; moving data stored on a set of blades that were included in a previously created failure domain to a set of blades in the failure domain, as will be described in greater detail below. Readers will appreciate that while in some embodiments one or more of the blades (104, 108, 112, 116) may be used for dynamically forming a failure domain in a storage system that includes a plurality of blades by carrying out the steps listed above, in alternative embodiments, another apparatus that includes at least computer memory and a computer processor may be used for dynamically forming a failure domain in a storage system that includes a plurality of blades by carrying out the steps listed above.

Figure 2:
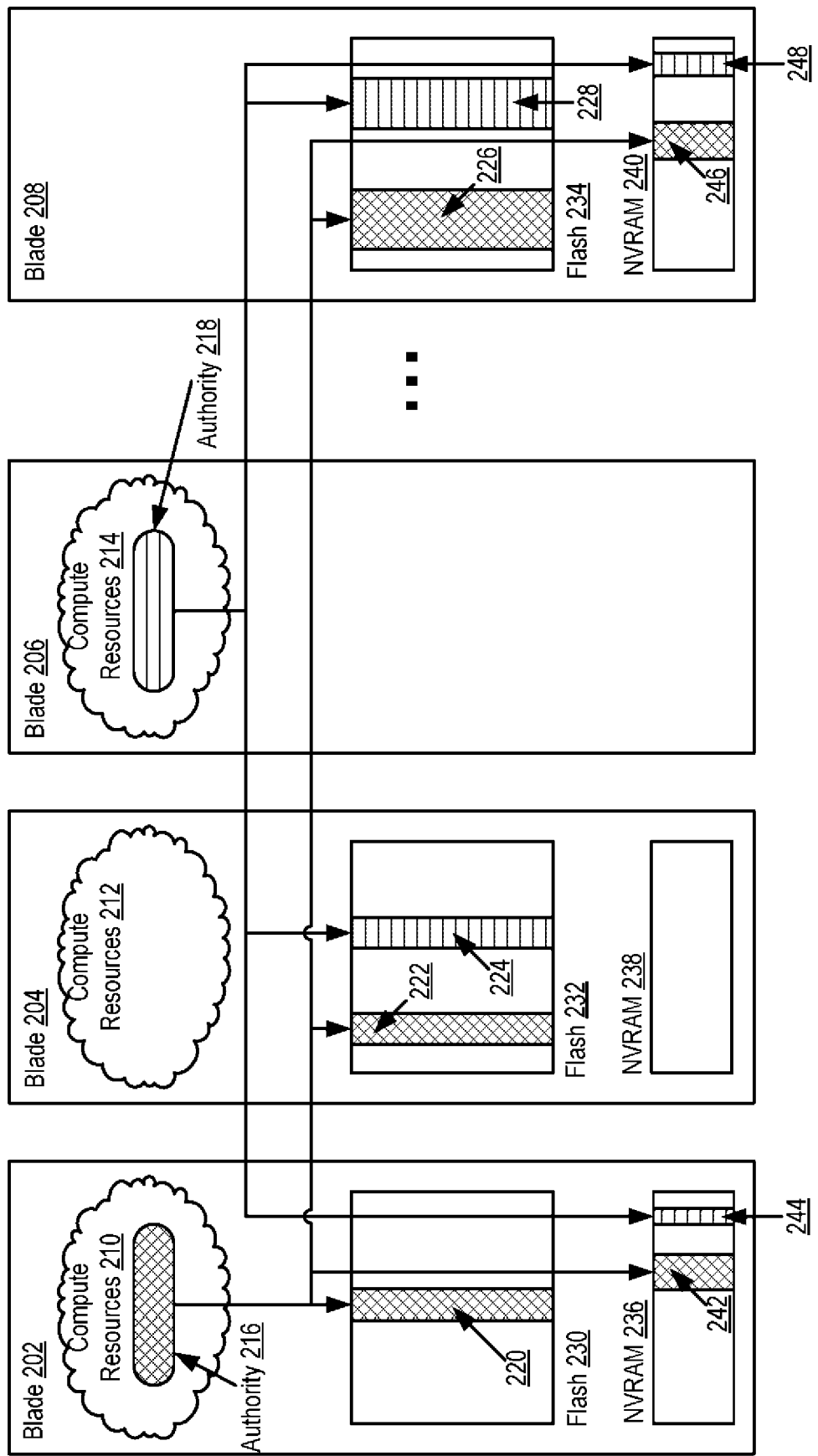
FIG. 2 sets forth a diagram of a set of blades useful in dynamically forming a failure domain in a storage system according to embodiments of the present disclosure.

For further explanation, FIG. 2 sets forth a diagram of a set of blades (202, 204, 206, 208) useful in dynamically forming a failure domain in a storage system according to embodiments of the present disclosure. Although blades will be described in greater detail below, the blades (202, 204, 206, 208) depicted in FIG. 2 may include compute resources (210, 212, 214), storage resources in the form of flash memory (230, 232, 234), storage resources in the form of non-volatile random access memory ('NVRAM') (236, 238, 240), or any combination thereof. In the example depicted in FIG. 2, the blades (202, 204, 206, 208) are of differing types. For example, one blade (206) includes only compute resources (214), another blade (208) includes only storage resources, depicted here as flash (234) memory and NVRAM (240), and two of the blades (202, 204) include compute resources (210, 212) as well as storage resources in the form of flash (230, 232) memory and NVRAM (236, 238). In such of an example, the blade (206) that includes only compute resources (214) may be referred to as a compute blade, the blade (208) that includes only storage resources may be referred to as a storage blade, and the blades (202, 204) that include both compute resources (210, 212) and storage resources may be referred to as a hybrid blade.

The compute resources (210, 212, 214) depicted in FIG. 2 may be embodied, for example, as one or more computer processors, as well as memory that is utilized by the computer processor but not included as part of general storage within the storage system. The compute resources (210, 212, 214) may be coupled for data communication with other blades and with external client systems, for example, via one or more data communication busses that are coupled to the compute resources (210, 212, 214) via one or more data communication adapters.

The flash memory (230, 232, 234) depicted in FIG. 2 may be embodied, for example, as multiple flash dies which may be referred to as packages of flash dies or an array of flash dies. Such flash dies may be packaged in any number of ways, with a single die per package, multiple dies per package, in hybrid packages, as bare dies on a printed circuit board or other substrate, as encapsulated dies, and so on. Although not illustrated in FIG. 2, an input output (I/O) port may be coupled to the flash dies and a direct memory access (DMA') unit may also be coupled directly or indirectly to the flash dies. Such components may be implemented, for example, on a programmable logic device (PLD') such as a field programmable gate array ('FPGA'). The flash memory (230, 232, 234) depicted in FIG. 2 may be organized as pages of a predetermined size, blocks that include a predetermined number of pages, and so on.

The NVRAM (236, 238, 240) depicted in FIG. 2 may be embodied, for example, as one or more non-volatile dual in-line memory modules ('NVDIMMs'), as one more DRAM dual in-line memory modules ('DIMMs') that receive primary power through a DIMM slot but are also attached to a backup power source such as a supercapacitor, and so on. The NVRAM (236, 238, 240) depicted in FIG. 2 may be utilized as a memory buffer for temporarily storing data that will be written to flash memory (230, 232, 234), as writing data to the NVRAM (236, 238, 240) may be carried out more quickly than writing data to flash memory (230, 232, 234). In this way, the latency of write requests may be significantly improved relative to a system in which data is written directly to the flash memory (230, 232, 234).

In the example method depicted in FIG. 2, a first blade (202) includes a first authority (216) that is executing on the compute resources (210) within the first blade (202) and a second blade (206) includes a second authority (218) that is executing on the compute resources (214) within the second blade (206). Each authority (216, 218) represents a logical partition of control and may be embodied as a module of software executing on the compute resources (210, 212, 214) of a particular blade (202, 204, 206). Each authority (216, 218) may be configured to control how and where data is stored in storage system. For example, authorities (216, 218) may assist in determining which type of erasure coding scheme is applied to the data, authorities (216, 218) may assist in determining where one or more portions of the data may be stored in the storage system, and so on. Each authority (216, 218) may control a range of inode numbers, segment numbers, or other data identifiers which are assigned to data by a file system or some other entity.

Readers will appreciate that every piece of data and every piece of metadata stored in the storage system is owned by a particular authority (216, 218). Each authority (216, 218) may cause data that is owned by the authority (216, 218) to be stored within storage that is located within the same blade whose computing resources are supporting the authority (216, 218) or within storage that is located on some other blade. For example, the authority (216) that is executing on the compute resources (210) within a first blade (202) has caused data to be stored within a portion (220) of flash (230) and a portion (242) of NVRAM (236) that is physically located within the first blade (202), The authority (216) that is executing on the compute resources (210) within the first blade (202) has also caused data to be stored within a portion (222) of flash (232) on the second blade (204) in the storage system as well as a portion (226) of flash (234) and a portion (246) of NVRAM (240) on the fourth blade (208) in the storage system. Likewise, the authority (218) that is executing on the compute resources (214) within the third blade (202) has caused data to be stored within a portion (244) of NVRAM (236) that is physically located within the first blade (202), within a portion (224) of flash (232) within the second blade (204), within a portion (228) of flash (234) within the fourth blade (208), and within a portion (248) of NVRANI (240) within the fourth blade (208).

Readers will appreciate that many embodiments other than the embodiment depicted in FIG. 2 are contemplated as it relates to the relationship between data, authorities, and system components. In some embodiments, every piece of data and every piece of metadata has redundancy in the storage system. In some embodiments, the owner of a particular piece of data or a particular piece of metadata may be a ward, with an authority being a group or set of wards. Likewise, in some embodiments there are redundant copies of authorities. In some embodiments, authorities have a relationship to blades and the storage resources contained therein. For example, each authority may cover a range of data segment numbers or other identifiers of the data and each authority may be assigned to a specific storage resource. Data may be stored in a segment according to some embodiments of the present disclosure, and such segments may be associated with a segment number which serves as indirection for a configuration of a RAID stripe. A segment may identify a set of storage resources and a local identifier into the set of storage resources that may contain data. In some embodiments, the local identifier may be an offset into a storage device and may be reused sequentially by multiple segments. In other embodiments the local identifier may be unique for a specific segment and never reused. The offsets in the storage device may be applied to locating data for writing to or reading from the storage device.

Readers will appreciate that if there is a change in where a particular segment of data is located (e.g., during a data move or a data reconstruction), the authority for that data segment should be consulted. In order to locate a particular piece of data, a hash value for a data segment may be calculated, an inode number may be applied, a data segment number may be applied, and so on. The output of such an operation can point to a storage resource for the particular piece of data. In some embodiments the operation described above may be carried out in two stages. The first stage maps an entity identifier (ID) such as a segment number, an inode number, an object ID, or directory number to an authority identifier. This mapping may include a calculation such as a hash or a bit mask. The second stage maps the authority identifier to a particular storage resource, which may be done through an explicit mapping. The operation may be repeatable, so that when the calculation is performed, the result of the calculation reliably points to a particular storage resource. The operation may take the set of reachable storage resources as input, and if the set of reachable storage resources changes, the optimal set changes. In some embodiments, a persisted value represents the current assignment and the calculated value represents the target assignment the cluster will attempt to reconfigure towards.

The compute resources (210, 212, 214) within the blades (202, 204, 206) may be tasked with breaking up data to be written to storage resources in the storage system. When data is to be written to a storage resource, the authority for that data is located as described above. When the segment ID for data is already determined, the request to write the data is forwarded to the blade that is hosting the authority, as determined using the segment ID. The computing resources on such a blade may be utilized to break up the data and transmit the data for writing to a storage resource, at which point the transmitted data may be written as a data stripe in accordance with an erasure coding scheme. In some embodiments, data is requested to be pulled and in other embodiments data is pushed. When compute resources (210, 212, 214) within the blades (202, 204, 206) are tasked with reassembling data read from storage resources in the storage system, the authority for the segment ID containing the data is located as described above.

The compute resources (210, 212, 214) within the blades (202, 204, 206) may also be tasked with reassembling data read from storage resources in the storage system. The compute resources (210, 212, 214) that support the authority that owns the data may request the data from the appropriate storage resource. In some embodiments, the data may be read from flash storage as a data stripe. The compute resources (210, 212, 214) that support the authority that owns the data may be utilized to reassemble the read data, including correcting any errors according to the appropriate erasure coding scheme, and forward the reassembled data to the network. In other embodiments, breaking up and reassembling data, or some portion thereof, may be performed by the storage resources themselves.

The preceding paragraphs discuss the concept of a segment. A segment may represent a logical container of data in accordance with some embodiments. A segment may be embodied, for example, as an address space between medium address space and physical flash locations. Segments may also contain metadata that enables data redundancy to be restored (rewritten to different flash locations or devices) without the involvement of higher level software. In some embodiments, an internal format of a segment contains client data and medium mappings to determine the position of that data. Each data segment may be protected from memory and other failures, for example, by breaking the segment into a number of data and parity shards. The data and parity shards may be distributed by striping the shards across storage resources in accordance with an erasure coding scheme.

Figure 3:
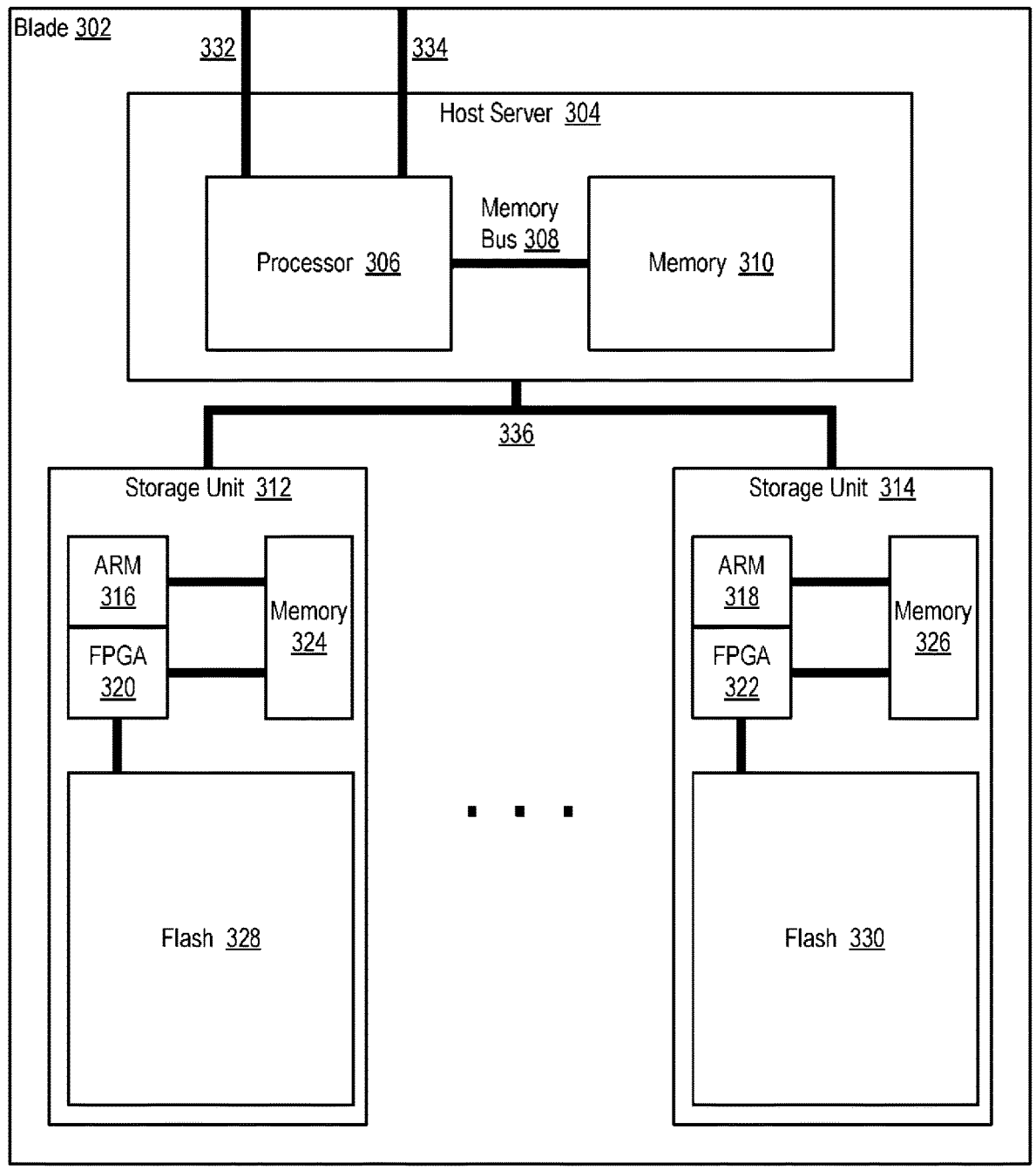
FIG. 3 sets forth a diagram of a blade useful in dynamically forming a failure domain in a storage system according to embodiments of the present disclosure.

For further explanation, FIG. 3 sets forth a diagram of a blade (302) useful in dynamically forming a failure domain in a storage system according to embodiments of the present disclosure. As described above, the storage system may include storage blades, compute blades, hybrid blades, or any combination thereof. The example depicted in FIG. 3 represents an embodiment of a hybrid blade as the blade (302) includes both compute resources and storage resources.

The compute resources in the blade (302) depicted in FIG. 3 includes a host server (304) that includes a computer processor (306) coupled to memory (310) via a memory bus (308). The computer processor (306) depicted in FIG. 3 may be embodied, for example, as a central processing unit ('CPU') or other form of electronic circuitry configured to execute computer program instructions. The computer processor (306) may utilize the memory (310) to store data or other information useful during the execution of computer program instructions by the computer processor (306). Such memory (310) may be embodied, for example, as DRAM that is utilized by the computer processor (306) to store information when the computer processor (306) is performing computational tasks such as creating and sending I/O operations to one of the storage units (312, 314), breaking up data, reassembling data, and other tasks.

In the example depicted in FIG. 3, the computer processor (306) is coupled to two data communication links (332, 334). Such data communications links (332, 334) may be embodied, for example, as Ethernet links that are coupled to a data communication network via a network adapter. The computer processor (306) may receive input/output operations that are directed to the attached storage units (312, 314), such as requests to read data from the attached storage units (312, 314) or requests to write data to the attached storage units (312, 314).

The blade (302) depicted in FIG. 3 also includes storage resources in the form of one or more storage units (312, 314). Each storage unit (312, 314) may include flash (328, 330) memory as well as other forms of memory (324, 326), such as the NVRAM discussed above. In the example depicted in FIG. 3, the storage units (312, 314) may include integrated circuits such as a field-programmable gate array ('FPGA') (320, 322), microprocessors such as an Advanced RISC Machine (ARM') microprocessor that are utilized to write data to and read data from the flash (328, 330) memory as well as the other forms of memory (324, 326) in the storage unit (312, 314), or any other form of computer processor. The FPGAs (320, 322) and the ARM (316, 318) microprocessors may, in some embodiments, perform operations other than strict memory accesses. For example, in some embodiments the FPGAs (320, 322) and the ARM (316, 318) microprocessors may break up data, reassemble data, and so on. In the example depicted in FIG. 3, the computer processor (306) may access the storage units (312, 314) via a data communication bus (336) such as a PCIe bus.

Readers will appreciate that a compute blade may be similar to the blade (302) depicted in FIG. 3 as the compute blade may include one or more host servers that are similar to the host server (304) depicted in FIG. 3. Such a compute blade may be different than the blade (302) depicted in FIG. 3, however, as the compute blade may lack the storage units (312, 314) depicted in FIG. 3. Readers will further appreciate that a storage blade may be similar to the blade (302) depicted in FIG. 3 as the storage blade may include one or more storage units that are similar to the storage units (312, 314) depicted in FIG. 3. Such a storage blade may be different than the blade (302) depicted in FIG. 3, however, as the storage blade may lack the host server (304) depicted in FIG. 3. The example blade (302) depicted in FIG. 3 is included only for explanatory purposes. In other embodiments, the blades may include additional processors, additional storage units, compute resources that are packaged in a different manner, storage resources that are packaged in a different manner, and so on.

Figure 4:
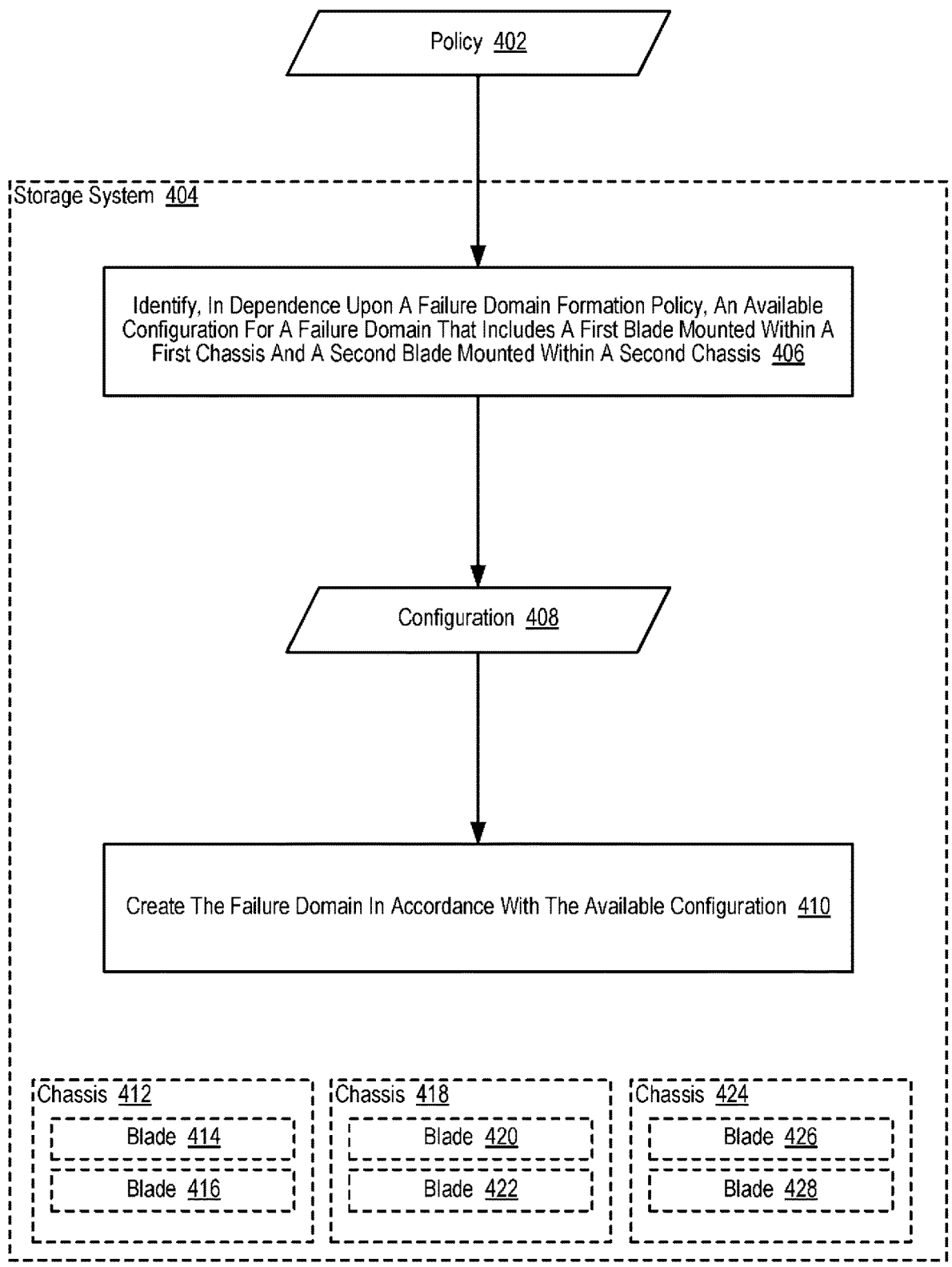
FIG. 4 sets forth a flow chart illustrating an example method for dynamically forming a failure domain in a storage system that includes a plurality of blades according to embodiments of the present disclosure.

For further explanation, FIG. 4 sets forth a flowchart illustrating an example method of dynamically forming a failure domain in a storage system (404) according to embodiments of the present disclosure. Although depicted in less detail, the storage system (404) in FIG. 4 may be similar to storage systems described above with reference to FIGS. 1-3. The storage system (404) in FIG. 4 may therefore include a plurality of blades (414, 416, 420, 422, 426, 428) where each blade (414, 416, 420, 422, 426, 428) is mounted within one of a plurality of chassis (412, 418, 424). Each of the chassis (412, 418, 424) in FIG. 4 may be similar to the chassis described above, as each chassis (412, 418, 424) may be configured to support multiple types of blades (414, 416, 420, 422, 426, 428). Each chassis (412, 418, 424) may be configured, for example, to support storage blades, compute blades, hybrid blades, or any combination thereof.

The example method depicted in FIG. 4 includes identifying (406), in dependence upon a failure domain formation policy (402), an available configuration (408) for a failure domain. A failure domain may represent a group of components within the storage system (402) that can be negatively impacted by the failure of another component in the storage system (402). Such a failure domain may be embodied, for example, as a group of blades that are all connected to the same power source. In such an example, a failure of the power source would negatively impact the group of blades as power would be lost to the group of blades. A failure domain may also be embodied, for example, as a group of blades that carry out data communications by connecting to one or more data communications networks via a data communications bus provided by a single chassis. In such an example, a failure of the chassis or the data communications bus would negatively impact the group of blades as the data communications bus would become unavailable and the group of blades would have no way to access the one or more data communications networks.

In the example method depicted in FIG. 4, a failure domain may also be embodied as a group of devices that are logically dependent upon each other. As an example of a failure domain that is embodied as a group of devices that are logically dependent upon each other, a failure domain may consist of a group of blades that some piece of data (e.g., all data in a database) is striped across. In such an example, a failure of one of the blades could negatively impact the group of blades that are logically dependent upon each other, as the portion of the piece of data that is stored on the failed blade could be lost.

In the example method depicted in FIG. 4, an available configuration (408) for a failure domain is identified (406) in dependence upon a failure domain formation policy (402). The failure domain formation policy (402) depicted in FIG. 4 may be embodied, for example, as a set of rules that are used to identify satisfactory configurations for a particular failure domain. The failure domain formation policy (402) may include rules that specify, for example, the maximum number of blades in each chassis that may be included in the failure domain, the maximum number of blades in a particular failure domain that may fail without data loss, the maximum number of chassis in a particular failure domain that may fail without data loss, the maximum number of network hops that are permissible between two or more blades in a particular failure domain, the minimum amount of network bandwidth that must be available between two or more blades in a particular failure domain, the minimum amount of storage capacity for one or more blades in a particular failure domain, the maximum age for one or more blades in a particular storage domain, and so on. In such an example, configurations that do not adhere to the rules set forth in the failure domain formation policy (402) may not be used to form a failure domain.

In the example method depicted in FIG. 4, identifying (406) an available configuration (408) for a failure domain in dependence upon a failure domain formation policy (402) may be carried out, for example, by identifying all possible configurations and identifying the configurations that satisfy the rules set forth in the failure domain formation policy (402). Consider an example in which the failure domain formation policy (402) contains rules indicating that the failure domain should include three blades that data will be striped across, and that the failure domain should utilize an n+1 data redundancy policy such that two of the blades will contain user data and the other blade will contain redundancy data. Assume that the failure domain formation policy (402) also includes a rule specifying that, for a given stripe, the loss of one blade should not result in user data being lost while the loss of two or more blades can result in user data being lost. Continuing with the example, assume that the failure domain formation policy (402) also contains a rule specifying that the failure domain should be able to tolerate the failure an entire chassis without the loss of user data.

Readers will appreciate that while many possible configurations that include three blades can be identified, some of those configurations would not adhere to the failure domain formation policy (402). For example, a configuration that includes both blades (414, 416) in a first chassis (412) and a first blade (420) in a second chassis (418) would not adhere to the failure domain formation policy (402) as the failure of the first chassis (412) would result in the loss of user data, given that two of the three blades in the failure domain would be lost. A configuration that includes one and only one blade from each of the three chassis (412, 418, 424), however, would adhere to the failure domain formation policy (402) as the failure of any single chassis (412, 418, 424) would not result in the loss of user data, given that only one of the three blades in the failure domain would be lost if a single chassis (412, 418, 424) were to fail.

The example method depicted in FIG. 4 also includes creating (410) the failure domain in accordance with the available configuration (408). Creating (410) the failure domain in accordance with the available configuration (408) may be carried out, for example, by configuring a storage array controller to write data for applications, users, or other entities that are associated with a particular failure domain to the blades that are included in the available configuration (408) that was identified (406) for the failure domain, by configuring an authority that is associated with a particular failure domain to write data to the blades that are included in the available configuration (408) that was identified (406) for the failure domain, and so on. Consider the example described above, in which a configuration that includes one and only one blade from each of the three chassis (412, 418, 424) would adhere to the failure domain formation policy (402). In such an example, assume that an available configuration (408) that included a first blade (414) mounted in a first chassis (412), a second blade (422) mounted in a second chassis (412), and a second blade (428) mounted in a third chassis (412) was identified (406). In such an example, creating (410) the failure domain in accordance with the available configuration (408) may be carried out by configuring an authority that is associated with the failure domain to write data to memory that is contained within the first blade (414) mounted in the first chassis (412), the second blade (422) mounted in the second chassis (412), and the second blade (428) mounted in the third chassis (412). The authority may write data to such blades, and may also create redundancy data (e.g., parity data) in each of the blades in accordance with a data redundancy policy that may be specified in the failure domain formation policy (402). Readers will appreciate that in such an example, the failure domain can include at least one blade mounted within a first chassis and another blade mounted within a second chassis.

In the example method depicted in FIG. 4, the storage system (404) may consist of different sets of blades (414, 416, 420, 422, 426, 428) configured within one of a plurality of chassis (412, 418, 424). The sets of blades (414, 416, 420, 422, 426, 428) may be different as the sets may include a different number of blades, blades of differing types, blades with nonuniform storage capacities, blades with non-uniform processing capacities, and so on. In addition to the sets of blades (414, 416, 420, 422, 426, 428) being different, two blades within the same set may also be different as the two blades may have non-uniform amounts and types of storage resources within each blade, the two blades may have non-uniform amounts and types of processing resources within each blade, and so on.

Figure 5:
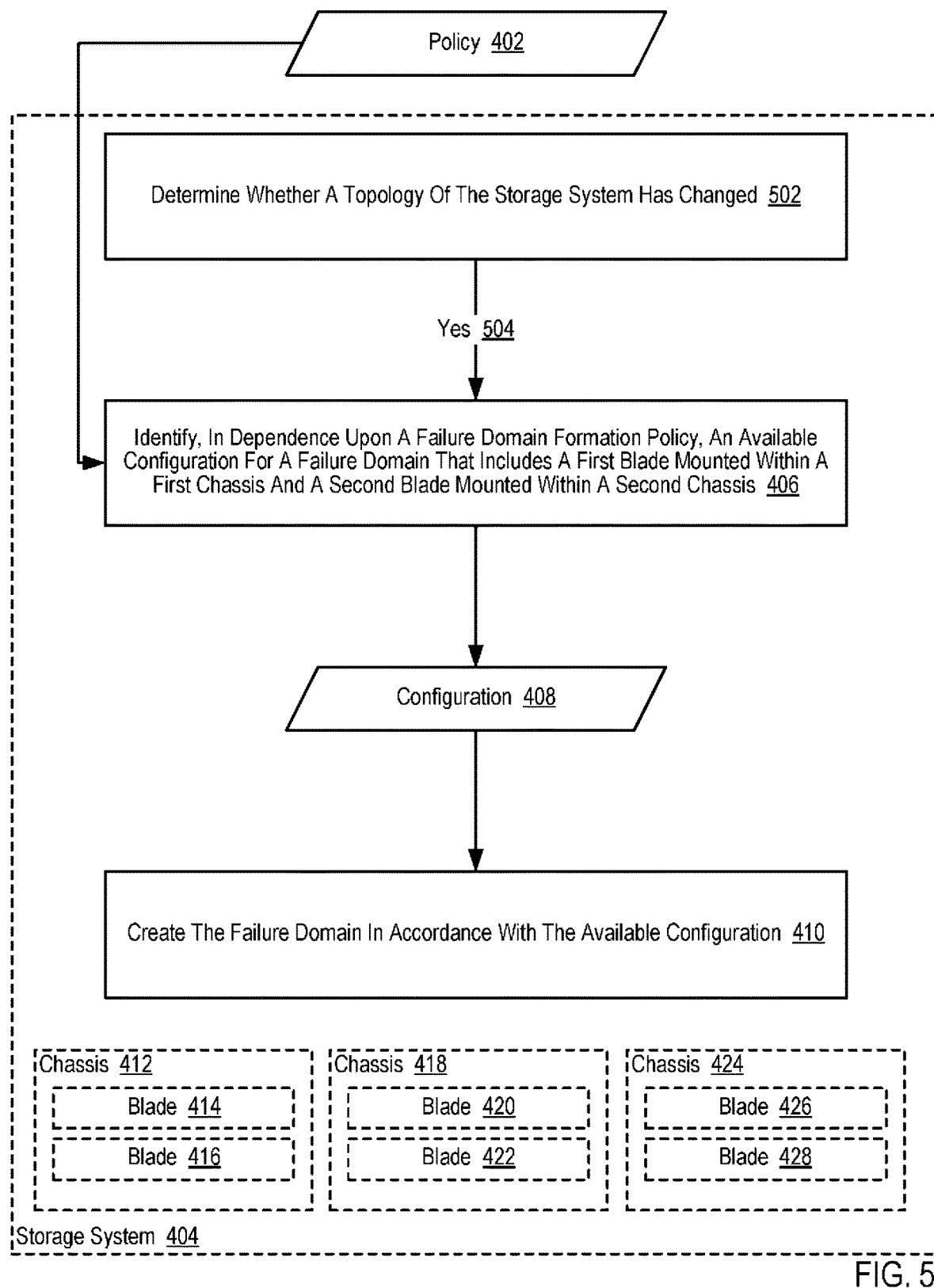
FIG. 5 sets forth a flow chart illustrating an additional example method for dynamically forming a failure domain in a storage system that includes a plurality of blades according to embodiments of the present disclosure.

For further explanation, FIG. 5 sets forth a flowchart illustrating an additional example method of dynamically forming a failure domain in a storage system (404) according to embodiments of the present disclosure. The example method depicted in FIG. 5 is similar to the example method depicted in FIG. 4, as the example method depicted in FIG. 5 also includes identifying (406) an available configuration (408) for a failure domain in dependence upon a failure domain formation policy (402) and creating (410) the failure domain in accordance with the available configuration (408).

The example method depicted in FIG. 5 also includes determining (502) whether a topology of the storage system (404) has changed. The topology of the storage system (404) may be characterized by various aspects of the physical configuration of the storage system (404) such as, for example, the number of chassis (412, 418, 424) in the storage system (404), the number of blades (414, 416, 420, 422, 426, 428) in each chassis (412, 418, 424), the storage capacity of one or more blades (414, 416, 420, 422, 426, 428), the processing capacity one or more blades (414, 416, 420, 422, 426, 428), and so on. Determining (502) whether a topology of the storage system (404) has changed may be carried out, for example, by detecting that a new chassis has been added to the storage system (404), by detecting that a new blade has been added to the storage system (404), by detecting that a blade has failed or otherwise been removed from the storage system (404), by detecting that a blade has been moved from a first chassis to a second chassis, and so on. In such an example, detecting that a component has been added to the storage system (404) may be accomplished through the use of sensors that detect the insertion of a component, through the use of a device registration process that is carried out when a new component is inserted into the storage system (404), and in other ways. Detecting that a component has been removed from the storage system (404) may be accomplished through the use of sensors that detect the removal of a component, through the use of a communication process determining that a component is unreachable, and in other ways.

The topology of the storage system (404) may also be characterized by various aspects of the logical configuration of the storage system (404) such as, for example, a configuration setting that defines a RAID level that is utilized for striping data across blades in the storage system, a configuration setting that defines which redundancy policy that data contained within a particular write group should adhere to, a configuration setting that identifies the number of snapshots to be retained in the system, or any other configuration that impacts how the storage system (404) will operate. Determining (502) whether a topology of the storage system (404) has changed may therefore be carried out, for example, by detecting that a particular configuration setting has changed.

In the example method depicted in FIG. 5, identifying (406) an available configuration (408) for a failure domain in dependence upon a failure domain formation policy (402) may be carried out in response to affirmatively (504) determining that the topology of the storage system (404) has changed. Readers will appreciate that when the topology of the storage system (404) has changed, new configurations for the failure domain may become available, previously existing configurations for the failure domain may cease to be available, and so on. As such, the storage system (404) may be configured to identify (406) an available configuration (408) for the failure domain in dependence upon the failure domain formation policy (402) by identifying all possible configurations available in the new topology of the storage system (404) and identifying the configurations that best satisfy the rules set forth in the failure domain formation policy (402).

Figure 6:
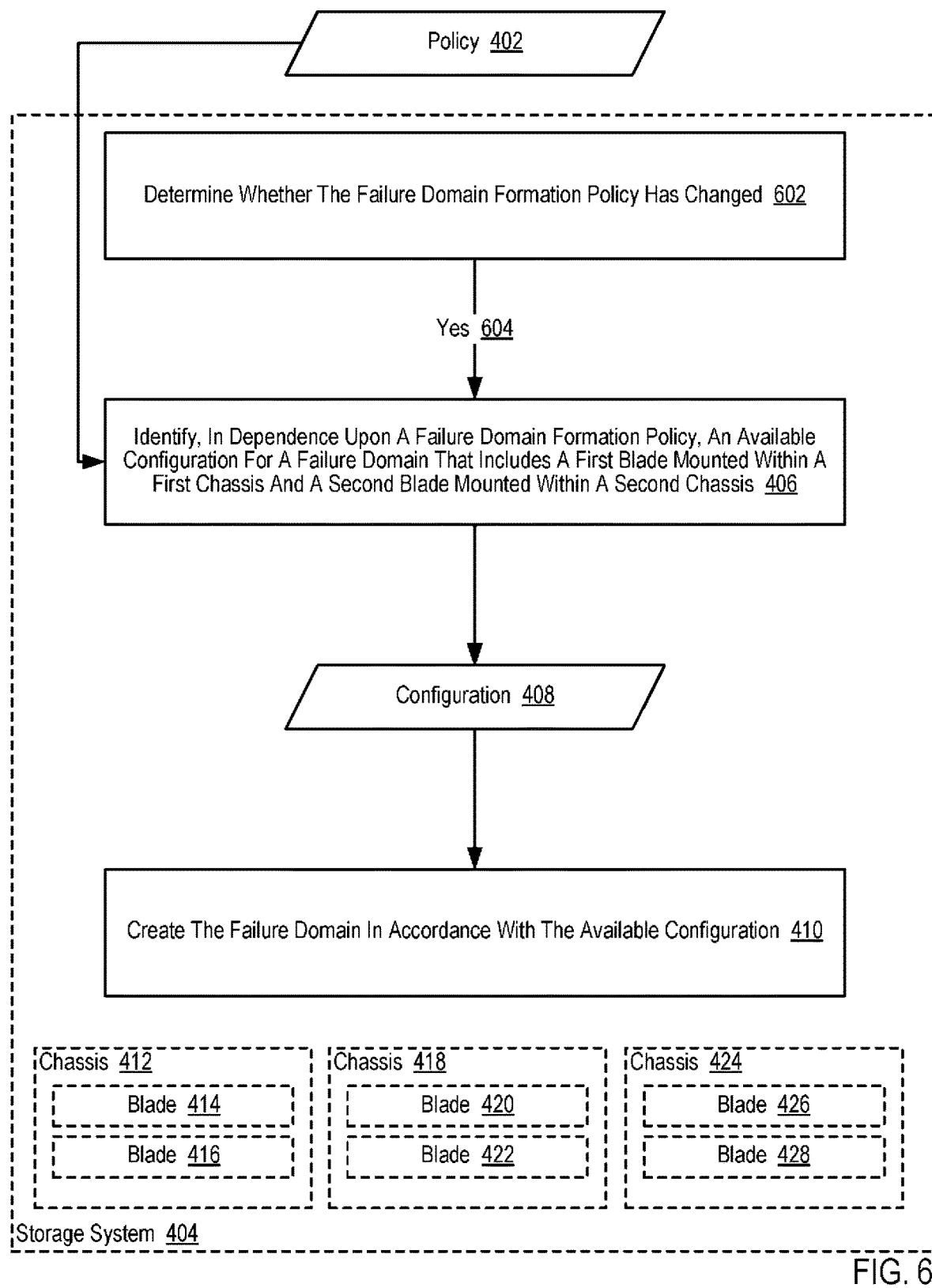
FIG. 6 sets forth a flow chart illustrating an additional example method for dynamically forming a failure domain in a storage system that includes a plurality of blades according to embodiments of the present disclosure.

For further explanation, FIG. 6 sets forth a flowchart illustrating an additional example method of dynamically forming a failure domain in a storage system (404) according to embodiments of the present disclosure. The example method depicted in FIG. 6 is similar to the example method depicted in FIG. 4, as the example method depicted in FIG. 6 also includes identifying (406) an available configuration (408) for a failure domain in dependence upon a failure domain formation policy (402) and creating (410) the failure domain in accordance with the available configuration (408).

The example method depicted in FIG. 6 also includes determining (602) whether the failure domain formation policy (402) has changed. The storage system (404) may determine (602) that the failure domain formation policy (402) has changed, for example, by determining that a new rule has been added to the failure domain formation policy (402), by determining that an existing rule has been modified in the failure domain formation policy (402), by determining that a previously existing rule has been removed from the failure domain formation policy (402), by determining that the failure domain formation policy (402) has been replaced with an updated failure domain formation policy (402), and so on. The failure domain formation policy (402) may be modified, for example, by a system administrator or user through the use of one or more interfaces that present the failure domain formation policy (402) to the user and allows the user to modify the failure domain formation policy (402). Alternatively, a new failure domain formation policy (402) or a modified failure domain formation policy (402) may be deployed on the storage system (404) through the use of some deployment module within the storage system (404), through the use of a centralized deployment module that is external to the storage system (404), and so on.

In the example method depicted in FIG. 6, identifying (406) an available configuration (408) for a failure domain in dependence upon a failure domain formation policy (402) may be carried out in response to affirmatively (604) determining that the failure domain formation policy (402) has changed. Readers will appreciate that when the failure domain formation policy (402) has changed, configurations that previously did not satisfy the rules set forth in the failure domain formation policy (402) may satisfy the rules set forth in the modified failure domain formation policy (402), configurations that previously satisfied the rules set forth in the failure domain formation policy (402) may not satisfy the rules set forth in the modified failure domain formation policy (402), and so on. As such, the storage system (404) may be configured to identify (406) an available configuration (408) for the failure domain in dependence upon the modified failure domain formation policy (402) by identifying all possible configurations available in the new topology of the storage system (404) and identifying the configurations that best satisfy the rules set forth in the modified failure domain formation policy (402).

Figure 7:
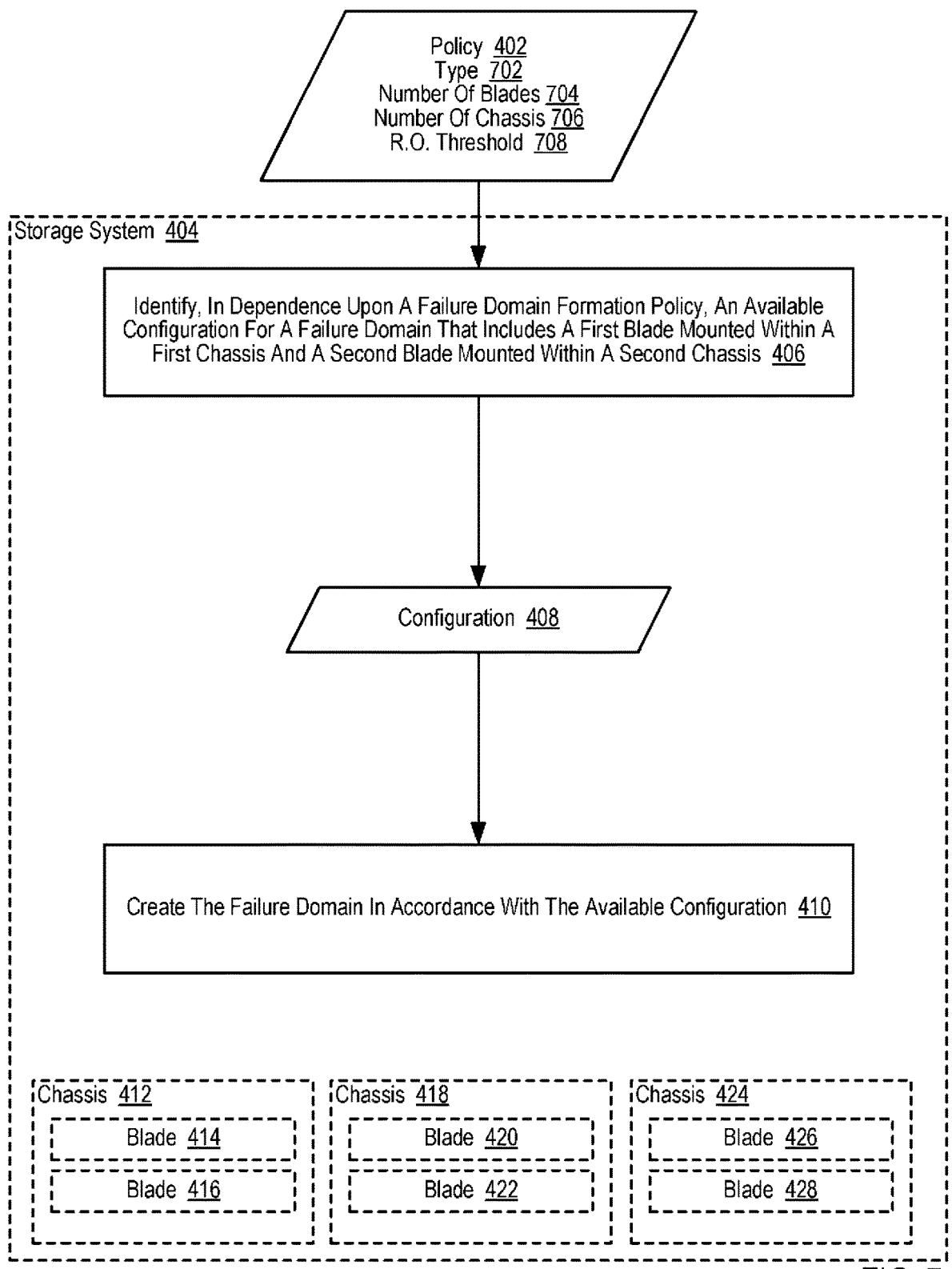
FIG. 7 sets forth a flow chart illustrating an additional example method for dynamically forming a failure domain in a storage system that includes a plurality of blades according to embodiments of the present disclosure.

For further explanation, FIG. 7 sets forth a flowchart illustrating an additional example method of dynamically forming a failure domain in a storage system (404) according to embodiments of the present disclosure. The example method depicted in FIG. 7 is similar to the example method depicted in FIG. 4, as the example method depicted in FIG.

7 also includes identifying (406) an available configuration (408) for a failure domain in dependence upon a failure domain formation policy (402) and creating (410) the failure domain in accordance with the available configuration (408).

In the example method depicted in FIG. 7, the failure domain formation policy (402) may specify one or more types (702) of data that are subject to the failure domain formation policy (402). In such an example, only the specified types (702) of data may be subject to a particular failure domain formation policy (402), such that different failure domain formation policies may be applied to different types of data. For example, a first failure domain formation policy may require that a first type of data be striped across a group of blades such that the loss of any two blades or any chassis will not result in data loss, while a second failure domain formation policy may require that a second type of data be striped across a group of blades such that the loss of any four blades or any two chassis will not result in data loss. In such an example, a failure domain that was in compliance with the second failure domain formation policy would require higher levels of data redundancy than a failure domain that was in compliance with the first failure domain formation policy.

Readers will appreciate that each type (702) of data may be embodied, for example, as data that may be characterized by any attribute that will allow for data of a particular type (702) to be distinguished from all other data in the storage system (404). A particular type (702) of data may therefore be embodied, for example, as data that is owned by a particular user or a particular type of user, as data that is owned by a particular application or a particular type of application, as data that has been deduplicated, as data that has resided within the storage system (404) for at least a predetermined amount of time, as data that resides on a particular type of blade, as data stored at a particular physical location (e.g., with the same storage device), as data stored at a particular logical location (e.g., within a particular volume or directory), and so on.

In view of the fact that an available configuration (408) for a failure domain is identified (406) in dependence upon a failure domain formation policy (402), the inclusion of the one or more types (702) of data in the failure domain formation policy (402) may cause the available configuration (408) for the failure domain to be identified (406) and a failure domain to be created (410), such that only data that is of the one or more types (702) of data specified in the failure domain formation policy (402) is stored in the failure domain. Consider an example in which a first failure domain formation policy specified that data owned by a first application was subject to the first failure domain formation policy and a second failure domain formation policy specified that data owned by a second application was subject to the second failure domain formation policy. In such an example, further assume that the first failure domain formation policy included a rule indicating that the failure domain should be configured in such a way that up to two blades could be lost without losing any of the data owned by the first application and the second failure domain formation policy included a rule indicating that the failure domain should be configured in such a way that up to one blade could be lost without losing any of the data owned by the second application. In such an example, a first failure domain that adheres to the first failure domain formation policy could be created to store data owned by the first application and a second failure domain that adheres to the second failure domain formation policy could be created to store data owned by the second application, where each failure domain had distinct members selected to provide the level of data redundancy specified in each respective failure domain formation policy.

In the example method depicted in FIG. 7, the failure domain formation policy (402) may also specify a number of blades (704) and a number of chassis (706) in the failure domain that may be lost without causing a loss of data stored in the failure domain. Consider an example in which the failure domain formation policy (402) specifies that failure domains should be created such that user data is striped across the blades in the failure domain in such a way that two blades may be lost without causing a loss of the user data stored in the failure domain, and that the user data is also striped across the blades in the failure domain in such a way that one chassis may be lost without causing a loss of the user data stored in the failure domain. In such an example, the failure domain formation policy (402) may include a first parameter that represents the number of blades (704) may be lost without causing a loss of data stored in the failure domain whose value is set to a value of two, and a second parameter that represents the number of chassis (706) may be lost without causing a loss of data stored in the failure domain whose value is set to a value of one.

In view of the fact that an available configuration (408) for a failure domain is identified (406) in dependence upon a failure domain formation policy (402), the inclusion of information describing the number of blades (704) and the number of chassis (706) in the failure domain that may be lost without causing a loss of data stored in the failure domain may be taken into account when identifying (406) an available configuration (408) for the failure domain. Continuing with the example in the preceding paragraph, further assume that the failure domain formation policy (402) contains rules indicating that the failure domain should include six blades. In such an example, many possible configurations that include six blades can be identified but some of those configurations would not adhere to the failure domain formation policy (402). For example, a configuration that includes more than three blades in a particular chassis (412, 418, 424) would not adhere to the failure domain formation policy (402), as the failure of any chassis that includes three or more blades to be lost would result in the loss of user data. A configuration that includes no more than two blades from a particular chassis, (412, 418, 424), however, would adhere to the failure domain formation policy (402) as the failure of any single chassis (412, 418, 424) would not result in the loss of user data.

In the example method depicted in FIG. 7, the failure domain formation policy (402) may also specify a redundancy overhead threshold (708). The redundancy overhead threshold (708) may be embodied, for example, as a value that specifies the maximum amount of storage resources within a failure domain that may be dedicated to storing redundancy data. The redundancy overhead of a particular failure domain may be calculated, for example, by dividing the amount of storage resources that are utilized to store redundancy data by the amount of blades that are utilized to store non-redundancy data (e.g., user data). Consider an example in which a failure domain includes four blades, and that data is striped across the four blades using RAID level 6, such that redundancy data (e.g., parity data), must be contained within two of the blades for a particular data stripe. In such an example, the redundancy overhead is 100%, as two blades are used to store user data and two blades are used to store redundancy data. If the failure domain includes ten blades where data is striped across the ten blades using RAID level 6, however, the redundancy overhead is only 25%, as eight blades are used to store user data and two blades are used to store redundancy data. In the method depicted in FIG. 7, the failure domain formation policy (402) may specify a redundancy overhead threshold (708) in terms of a maximum percentage of storage resources in a given failure domain that may be used to store redundancy data, in terms of a minimum percentage of storage resources in a given failure domain that must be used to store non-redundancy data, and in other ways as will occur to those of skill in the art in view of the teachings of the present disclosure. In view of the fact that an available configuration (408) for a failure domain is identified (406) in dependence upon a failure domain formation policy (402), the inclusion of information describing redundancy overhead threshold (708) may be taken into account when identifying (406) an available configuration (408) for the failure domain. If the redundancy overhead threshold (708) indicated that only 25% of the storage resources within a failure domain may be dedicated to storing redundancy data, for example, only those configurations that adhere to the redundancy overhead threshold (708) would be identified (406) as available configurations (408) for the failure domain.

Figure 8:
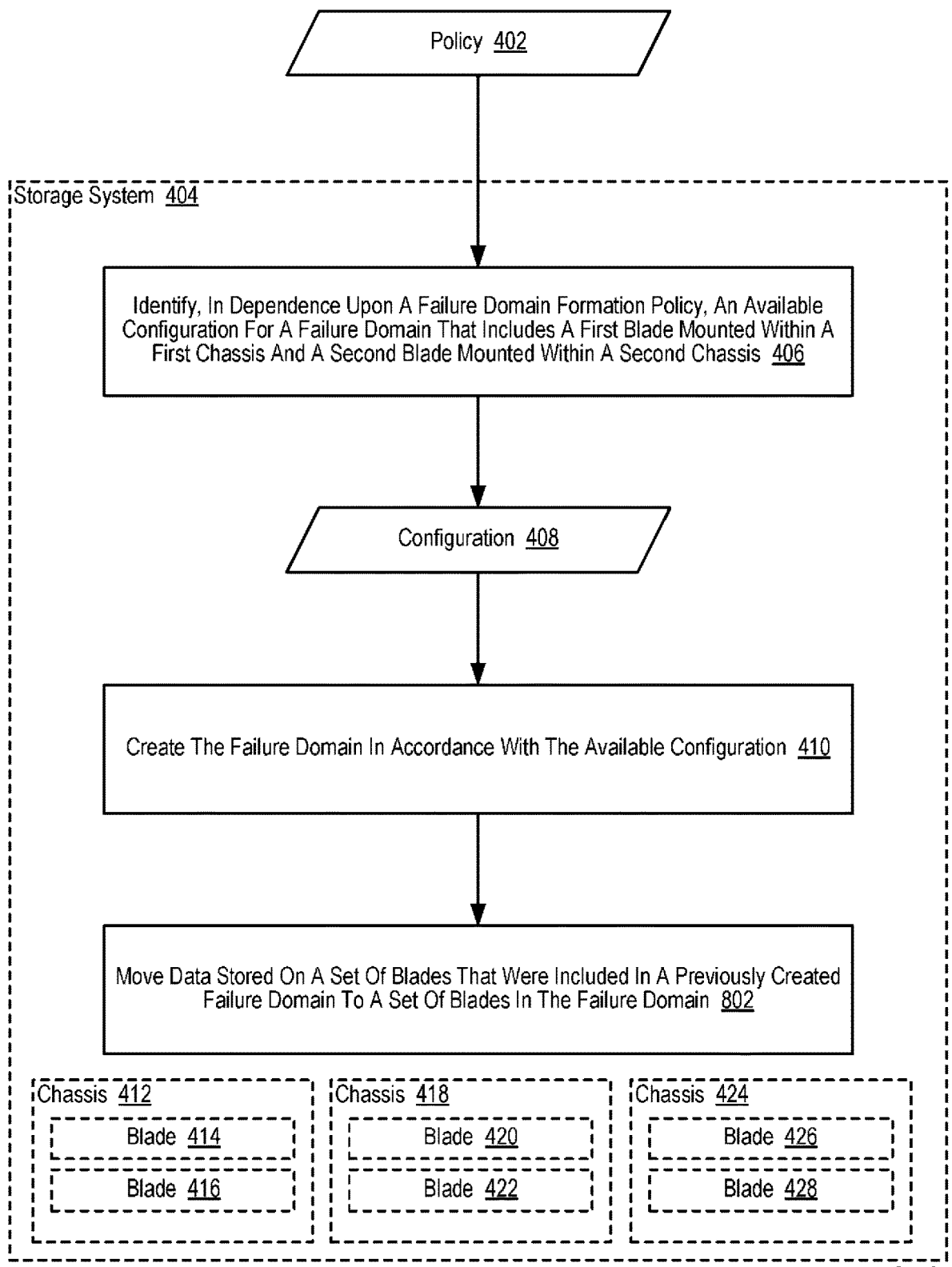
FIG. 8 sets forth a flow chart illustrating an additional example method for dynamically forming a failure domain in a storage system that includes a plurality of blades according to embodiments of the present disclosure.

For further explanation, FIG. 8 sets forth a flowchart illustrating an additional example method of dynamically forming a failure domain in a storage system (404) according to embodiments of the present disclosure. The example method depicted in FIG. 8 is similar to the example method depicted in FIG. 4, as the example method depicted in FIG. 8 also includes identifying (406) an available configuration (408) for a failure domain in dependence upon a failure domain formation policy (402) and creating (410) the failure domain in accordance with the available configuration (408).

The example method depicted in FIG. 8 also includes moving (802) data stored on a set of blades that were included in a previously created failure domain to a set of blades in the failure domain. In the example method depicted in FIG. 8, moving (802) data stored on a set of blades that were included in a previously created failure domain to a set of blades in the failure domain may be carried out, for example, by writing the data to the set of blades in the failure domain that was created (410) in accordance with the available configuration (408) and erasing the data from the set of blades that were included in a previously created failure domain. Readers will appreciate that such moving (802) data stored on a set of blades that were included in a previously created failure domain to a set of blades in the failure domain may be carried out, for example, in response to creating (410) the failure domain in accordance with the available configuration (408) after detecting a change to the topology of the storage system (404), in response to creating (410) the failure domain in accordance with the available configuration (408) after determining that the failure domain formation policy (402) had changed, and so on. In the example method depicted in FIG. 8, the newly created failure domain may include one or more of the blades that were part of the previously created failure domain, such that only a portion of the data that is stored on a set of blades that were included in the previously created failure domain needs to be moved (802), as some portion of the data may continue to be stored on the blades that were included in both the previously created failure domain and the newly created failure domain.

Figure 9:
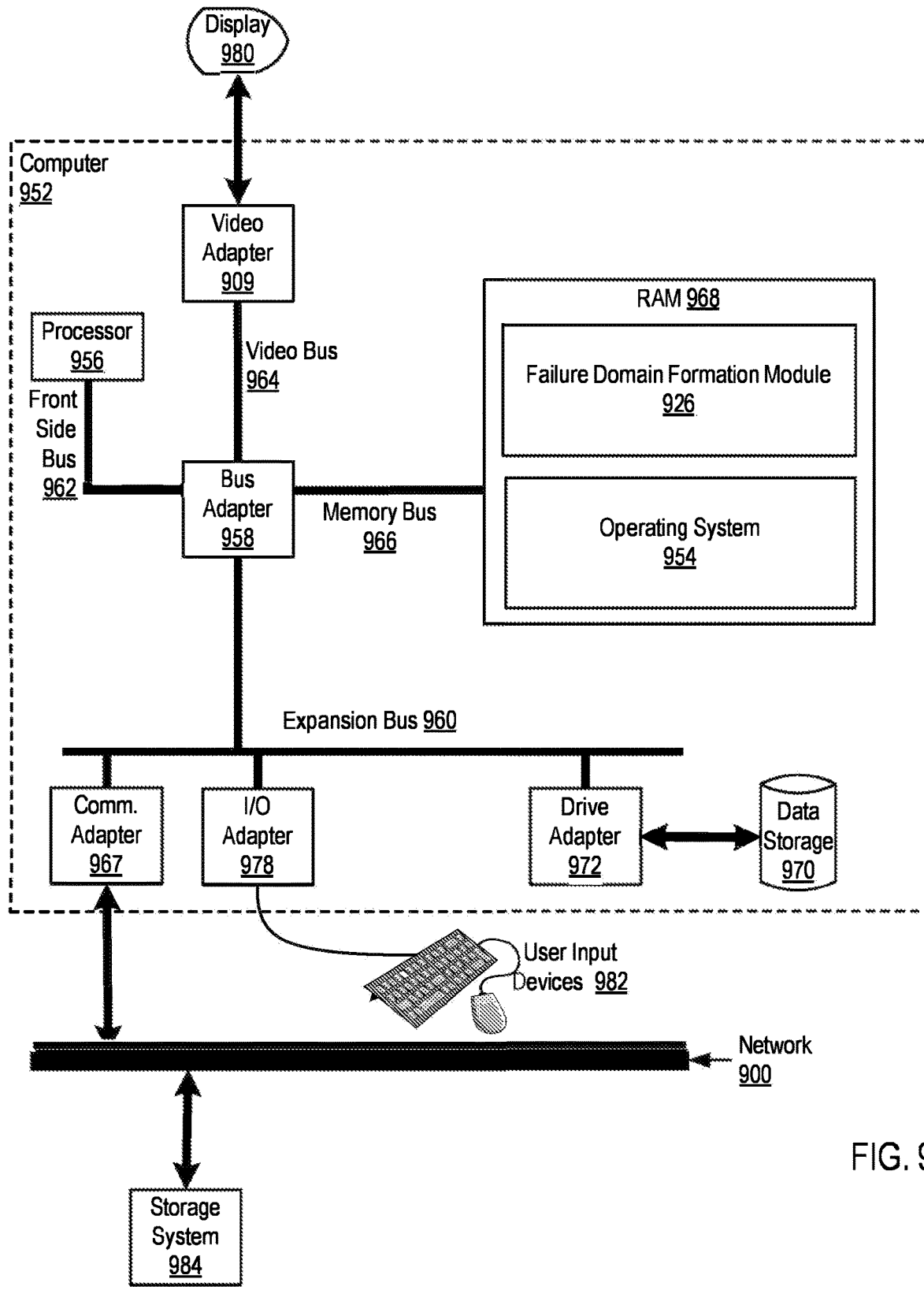
FIG. 9 sets forth a block diagram of automated computing machinery comprising an example computer useful in dynamically forming a failure domain in a storage system that includes a plurality of blades according to embodiments of the present disclosure.

For further explanation, FIG. 9 sets forth a block diagram of automated computing machinery comprising an example computer (952) useful in dynamically forming a failure domain in a storage system that includes a plurality of blades according to embodiments of the present disclosure. The computer (952) of FIG. 9 includes at least one computer processor (956) or "CPU" as well as random access memory ("RAM") (968) which is connected through a high speed memory bus (966) and bus adapter (958) to processor (956) and to other components of the computer (952). Stored in RAM (968) is a failure domain formation module (926), a module of computer program instructions for dynamically forming a failure domain in a storage system that includes a plurality of blades according to embodiments of the present disclosure. The failure domain formation module (926) may be configured for dynamically forming a failure domain in a storage system that includes a plurality of blades by: identifying, in dependence upon a failure domain formation policy, an available configuration for a failure domain that includes a first blade mounted within a first chassis and a second blade mounted within a second chassis, wherein each chassis is configured to support multiple types of blades; creating the failure domain in accordance with the available configuration; determining whether a topology of the storage system has changed, wherein identifying the available configuration for the failure domain is carried out responsive to affirmatively determining that the topology of the storage system has changed; determining whether the failure domain formation policy has changed, wherein identifying the available configuration for the failure domain is carried out responsive to affirmatively determining that the failure domain formation policy has changed; moving data stored on a set of blades that were included in a previously created failure domain to a set of blades in the failure domain, as was described in greater detail above.

Also stored in RAM (968) is an operating system (954). Operating systems useful in computers configured for dynamically forming a failure domain in a storage system that includes a plurality of blades according to embodiments described herein include UNIX, Linux™, Microsoft XP™, AIX™, IBM's i5/OS™, and others as will occur to those of skill in the art. The operating system (954) and failure domain formation module (926) in the example of FIG. 9 are shown in RAM (968), but many components of such software typically are stored in nonvolatile memory also, such as, for example, on a disk drive (970).

The example computer (952) of FIG. 9 also includes disk drive adapter (972) coupled through expansion bus (960) and bus adapter (958) to processor (956) and other components of the computer (952). Disk drive adapter (972) connects non-volatile data storage to the computer (952) in the form of disk drive (970). Disk drive adapters useful in computers configured for dynamically forming a failure domain in a storage system that includes a plurality of blades according to embodiments described herein include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computer (952) of FIG. 9 includes one or more input/output ("I/O") adapters (978). I/O adapters implement user-oriented input/output through, for example, software drivers and computer hardware for controlling output to display devices such as computer display screens, as well as user input from user input devices (982) such as keyboards and mice. The example computer (952) of FIG. 9 includes a video adapter (909), which is an example of an I/O adapter specially designed for graphic output to a display device (980) such as a display screen or computer monitor. Video adapter (909) is connected to processor (956) through a high speed video bus (964), bus adapter (958), and the front side bus (962), which is also a high speed bus.

The example computer (952) of FIG. 9 includes a communications adapter (967) for data communications with a storage system (984) as described above and for data communications with a data communications network (900). Such data communications may be carried out serially through RS-232 connections, through external buses such as a Universal Serial Bus ('USB'), a Fibre Channel data communications link, an Infiniband data communications link, through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for dynamically configuring the storage system to facilitate independent scaling of resources according to embodiments described herein include Ethernet (IEEE 802.3) adapters for wired data communications, Fibre Channel adapters, Infiniband adapters, and so on.

The computer (952) may implement certain instructions stored on RAM (968) for execution by processor (956) for dynamically forming a failure domain in a storage system that includes a plurality of blades. In some embodiments, dynamically forming a failure domain in a storage system that includes a plurality of blades may be implemented as part of a larger set of executable instructions. For example, the failure domain formation module (926) may be part of an overall system management process.

Readers will appreciate that although the example methods described above are depicted in a way where a series of steps occurs in a particular order, no particular ordering of the steps is required unless explicitly stated. Example embodiments of the present disclosure are described largely in the context of a fully functional computer system useful in dynamically forming a failure domain in a storage system. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

The present disclosure may be embodied as an apparatus, a method, a computer program product, and so on. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, a read-only memory (ROM), an erasable programmable read-only memory (EPROM or Flash memory), a static random access memory (SRAM), a portable compact disc read-only memory (CD-ROM), a digital versatile disk (DVD), a memory stick, and so on. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a wide area network (WAN), or the connection may be made to an external computer (for example, through the Internet using an Internet Service Provider). In some embodiments, electronic circuitry including, for example, programmable logic circuitry, FPGAs, or PLAs may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), computer program products, and so on. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of apparatuses, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense.

What is claimed is:

1. An apparatus comprising:
a memory operatively coupled to a processor, the memory having disposed within it computer program instructions that, when executed by the processor, cause the apparatus to perform operations comprising:
identifying a plurality of possible configurations for failure domains in a storage system;
identifying, in dependence upon a failure domain formation policy, a multi-chassis failure domain, wherein each chassis is configured to support multiple types of nodes, the multiple types of nodes including a first node having compute only resources and a second node having compute and storage resources, wherein a failure domain formation policy specifies a redundancy overhead threshold and wherein the failure domain formation policy relates to a group of components within the storage system impacted by failure of another component in the storage system;
determining whether received data is associated with the multi-chassis failure domain; and
storing the data in accordance with a configuration based on rules associated with the multi-chassis failure domain.

2. The apparatus of claim 1 further comprising computer program instructions that, when executed by the processor, cause the apparatus to carry out the step of determining whether a topology of the storage system has changed, wherein identifying the multi-chassis failure domain is carried out responsive to affirmatively determining that the topology of the storage system has changed.

3. The apparatus of claim 1 further comprising computer program instructions that, when executed by the processor, cause the apparatus to carry out the step of determining whether the failure domain formation policy has changed, wherein identifying the multi-chassis failure domain is carried out responsive to affirmatively determining that the failure domain formation policy has changed.

4. The apparatus of claim 1 wherein the failure domain formation policy specifies a plurality of types of data that are subject to the failure domain formation policy, each of the plurality of types of data to have a specific failure domain.

5. The apparatus of claim 1 wherein the failure domain formation policy specifies a number of nodes and a number of chassis in the multi-chassis failure domain that may be lost without causing a loss of data stored in the multi-chassis failure domain.

6. The apparatus of claim 1 further comprising computer program instructions that, when executed by the processor, cause the apparatus to carry out the step of moving data stored on a set of nodes that were included in a previously created failure domain to a set of nodes in the multi-chassis failure domain.

7. A method, comprising:
determining whether received data is associated with a multi-chassis failure domain, wherein each chassis is configured to support multiple types of nodes, the multiple types of nodes including a first node having compute only resources and a second node having compute and storage resources, wherein a failure domain formation policy specifies a redundancy overhead threshold and wherein the failure domain formation policy relates to a group of components within a storage system impacted by failure of another component in the storage system; and
storing the data in accordance with a configuration based on rules associated with the multi-chassis failure domain.

8. The method of claim 7 further comprising:
determining whether a topology of the storage system has changed, wherein the configuration for the multi-chassis failure domain is executed responsive to affirmatively determining that the topology of the storage system has changed and wherein each chassis is configured to support multiple types of nodes.

9. The method of claim 8 further comprising moving data stored on a set of nodes that were included in a previously created failure domain to a set of nodes in the multi-chassis failure domain.

10. The method of claim 7 further comprising:
determining whether a failure domain formation policy has changed, wherein a configuration for the multi-chassis failure domain is applied responsive to affirmatively determining that the failure domain formation policy has changed.

11. The method of claim 7 wherein a failure domain formation policy specifies a plurality of types of data that are subject to differing failure domains in accordance with the failure domain formation policy.

12. The method of claim 7 wherein a failure domain formation policy specifies a number of nodes and a number of chassis in the multi-chassis failure domain that may be lost without causing a loss of data stored in the multi-chassis failure domain.

13. A method, comprising:
identifying a plurality of possible configurations for failure domains in a storage system;
identifying, in dependence upon a failure domain formation policy, a multi-chassis failure domain, wherein each chassis is configured to support multiple types of nodes, the multiple types of nodes including a first node having compute only resources and a second node having compute and storage resources, wherein a failure domain formation policy specifies a redundancy overhead threshold and wherein the failure domain formation policy relates to a group of components within the storage system negatively impacted by failure of another component in the storage system;
determining whether received data is associated with the multi-chassis failure domain; and
storing the data in accordance with a configuration based on rules associated with the multi-chassis failure domain.

14. The method of claim 13 further comprising determining whether a topology of the storage system has changed, wherein identifying the multi-chassis failure domain is carried out responsive to affirmatively determining that the topology of the storage system has changed.

15. The method of claim 13 further comprising determining whether the failure domain formation policy has changed, wherein identifying the multi-chassis failure domain is carried out responsive to affirmatively determining that the failure domain formation policy has changed.

16. The method of claim 13 wherein the failure domain formation policy specifies a plurality of types of data that are subject to the failure domain formation policy, including a first data type to have a first failure domain and a second data type to have a second failure domain.

17. The method of claim 13 wherein the failure domain formation policy specifies a number of nodes and a number of chassis in the multi-chassis failure domain that may be lost without causing a loss of data stored in the multi-chassis failure domain.

* * * * *